United States Patent [19]

Karnofsky

[11] 3,992,170

[45] Nov. 16, 1976

[54] METHOD AND APPARATUS FOR MELTING ICE IN SALINE WATER CONVERSION SYSTEMS

[75] Inventor: George B. Karnofsky, Mount Lebanon Township, Allegheny County, Pa.

[73] Assignee: Dravo Corporation, Pittsburgh, Pa.

[22] Filed: Mar. 20, 1975

[21] Appl. No.: 560,124

[52] U.S. Cl. .................................. 62/535; 62/123
[51] Int. Cl.² ...................... B01D 9/04; C02B 1/12
[58] Field of Search ...................... 62/58, 123, 124

[56] References Cited
UNITED STATES PATENTS
3,119,772   1/1964   Hess et al. ............................. 62/58

*Primary Examiner*—Norman Yudkoff
*Assistant Examiner*—Barry I. Hollander
*Attorney, Agent, or Firm*—Buell, Blenko & Ziesenheim

[57] ABSTRACT

A method and apparatus for melting ice incidental to a freezing process for water desalination. Mechanical energy otherwise required to pump super heat in the compressed refrigerant vapor is conserved and rate of ice melting in the melter-washer reduced by providing an auxiliary blower for recycling uncondensed refrigerant vapor around the melter and providing for removal of net uncondensable refrigerant vapor to the secondary compressor from a point between the freezer and melter.

6 Claims, 3 Drawing Figures

METHOD AND APPARATUS FOR MELTING ICE IN SALINE WATER CONVERSION SYSTEMS

This invention relates to a method and means for saline water conversion in systems employing freezing by vaporization of a secondary refrigerant. Such systems are competitive with other saline water conversion processes primarily because they utilize mechanical energy efficiently. In the practice of desalination by freezing with a secondary refrigerant, it is essential to preserve this thermodynamic advantage. The invention is particularly concerned with a method and means for melting of ice incidental to obtaining potable water which minimize the mechanical energy required for the process.

Systems for extraction of potable water from saline water by freezing with secondary refrigerant are well known. The essential steps in these systems are partial freezing of feed saline water by vaporization of refrigerant, separation of ice crystals from the brine in which they are formed, and melting of washed ice by applying compressed refrigerant vapor directly to it. A method of accomplishing this is described by Dr. H. F. Weigandt in Research and Development Progress Report No. 41 Office of Saline Water, U.S. Department of the Interior, PB 161906, (1960), pages 17–23 inclusive. In the method there described the ice crystals are washed with water in a vertical moving ice bed, the wash water moving counterdirectionally to the motion of the ice.

A modification of the vertical column washing process described in the above Report No. 41 is described and claimed in my prior U.S. Pat. No. 3,400,549 issued Sept. 10, 1968, in which there is a marked increase in the operating rate of a column of given horizontal cross-sectional dimensions. The above patent and also my prior U.S. Pat. Nos. 3,478,531, 3,486,346, and 3,528,256 describe methods and apparatus whereby ice is made by partially freezing saline water through vaporization of normal butane in direct contact with the water, the latent heat of vaporization of the butane being supplied by the latent heat of freezing of the water.

Ice slurry from the freezer is pumped to a washer where the ice is washed free of residual brine, employing part of the product water for washing. Washed ice slurry is melted by applying to it, in direct contact, compressed butane vapor. Pressure in the freezer is in the range of 600 – 680 mm. absolute, at which butane boils at temperatures of freezing brine. Vapor from the freezer is compressed by a primary compressor to about 800 mm. which corresponds to a condensing temperature slightly above 32° F., the melting temperature of salt-free ice. Butane is condensed in the melter for recycle to the freezer. The process described is highly efficient thermodynamically because there are no indirect heat transfer surfaces.

Apparatus auxiliary to the primary freezing-washing-melting cycle includes a refrigeration system to pump heat from the primary cycle, which operates below ambient temperature, and interchanges for heat exchange between incoming warm saline water and outgoing cool product water and concentrated brine. The auxiliary refrigeration system is most conveniently a secondary compressor which takes suction at a convenient point in the primary butane recycle stream and removes from the primary cycle the butane vapor generated in the freezer which is in excess of the amount that can be condensed by all of the ice that reaches the melter. In my aforesaid patents 3,400,549, and 3,528,256, the entire flow of butane vapor from the freezer enters the primary compressor and is then moved on through the washer melter. The excess, uncondensable butane is removed from below the melter screen. After separation from the product water, the uncondensed butane flows directly to the secondary compressor. U.S. Pat. No. 3,620,035 to Martindale et al. also discloses a system similar to that of my aforesaid patents.

The advantage of the process described in my aforesaid patents was that the flow of excess butane through the bed of the washer-melter, in addition to the butane condensable on the ice, prevented the ice in the bed from becoming water logged. As long as the uncondensable butane flowed through the bed, butane condensation on the ice occurred at a melter pressure corresponding to less than 33° F. The temperature potential difference required for melting ice was less than 1° F. When uncondensable butane was removed at a point ahead of the melter in the foregoing systems, the ice bed became water-logged and the pressure required for melting increased.

It is however, thermodynamically desirable that the uncondensable butane be removed from the primary butane cycle at a point between the freezer and the melter. Otherwise, the energy corresponding to superheat in the compressed butane needlessly enters the primary butane cycle, from which it has to be pumped by the auxiliary refrigeration system with the expenditure of additional mechanical energy. The primary object of my present invention is to conserve that energy and to reduce the power required by the primary compressor by providing the butane vapor required to drive the water out of the ice bed as a controlled stream recirculating around the melter. The amount of butane vapor circulated may be as high as is desired for optimum improvement of heat transfer to the ice, whereas in earlier disclosures such as mine and Martindale's the vapor available for pushing water and condensed butane from the melting ice was limited to that flowing to the secondary compressor. The effect of vapor recirculation is to decrease the absolute pressure in the ice melter, thus decreasing the compression ratio and power consumption of the primary compressor.

To effect such conservation of energy, I provide in a desalination apparatus of the type described in my aforesaid U.S. Pat. No. 3,400,549, an auxiliary blower for recycling the butane vapor from below the screen of the washer-melter to the top of the washer-melter.

I further provide for removal of net uncondensed vapor in alternative arrangements from the suction side of the primary compressor or from the discharge side of the primary compressor, to the secondary compressor. The energy required for operation of the auxiliary blower is much less than the amount of energy saved by changing the location of the point from which net uncondensed butane vapor is removed from the primary butane cycle.

A detailed description of the invention is given hereafter in connection with the accompanying drawings, wherein.

Figure 2:
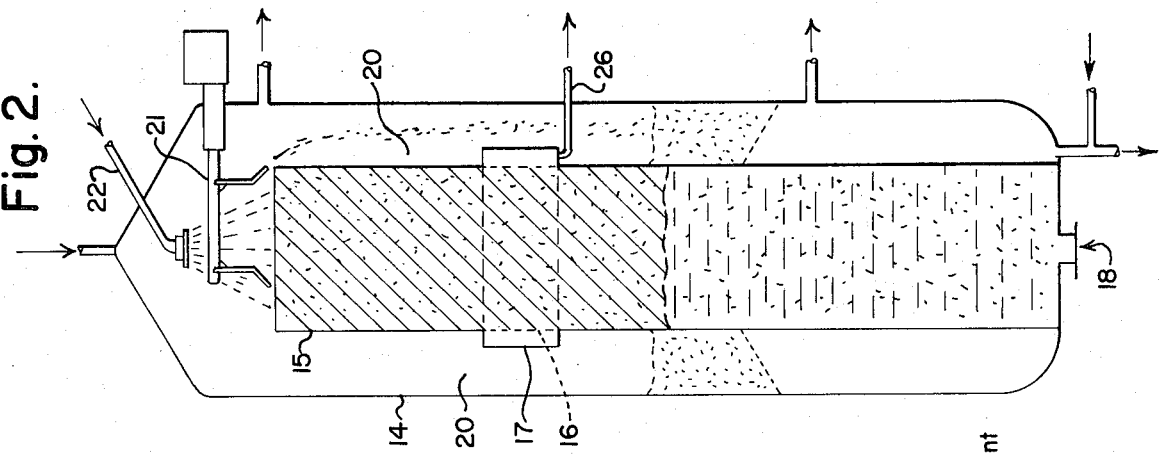
FIG. 2 is an enlarged sectional view of the vertical column washer-melter of FIG. 1.
Figure 1:
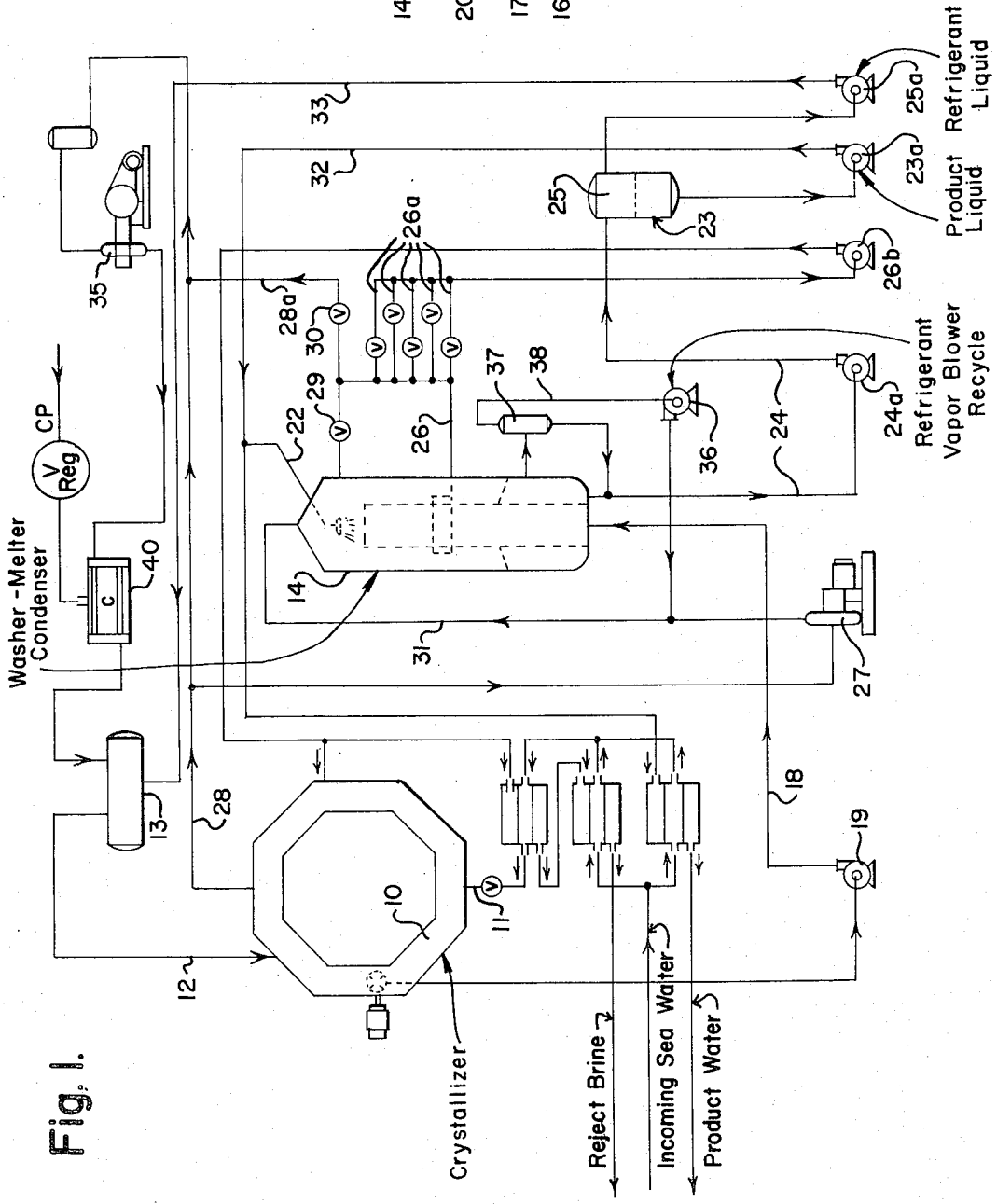
FIG. 1 is a diagrammatic representation of a presently preferred form of desalination apparatus embodying the invention.

Referring to FIGS. 1 and 2 of the drawings, the apparatus comprises a freezer or ice-forming vessel 10 having a saline water inlet line 11 and a liquid butane inlet line 12 from a liquid butane surge tank 13.

The apparatus further includes a vertical column washer-melter 14, illustratively shown as a vessel of rectangular horizontal cross-section. FIG. 2 represents a vertical sectional view of the washer-melter 14 on enlarged scale. As represented in the drawings, the washer-melter 14 has a central washer column 15. In each side of the column 15 oppositely disposed screens 16 are provided surrounded by a housing forming a chamber 17. The freezer vessel 10 is connected to the bottom of vertical column 15 by a line 18 in which a slurry pump 19 is interposed for delivery of a mixture of ice and brine formed in the freezer vessel into the bottom of the column 15. Two melter zones 20 of rectangular horizontal cross section enclose the vertical washer column. Ice is cut from the top of the vertical washer column 15 by a reciprocating ice cutter 21 and falls into zones 20 by gravity upon melting beds of ice supported at the bottom by screens.

Wash water is sprayed onto the top of the ice in vertical column 15 from line 22 which by-passes a part of the product water delivered from product tank 23. Tank 23 in turn receives water from the bottom of melter zones 20 supplied via line 24 by a pump 24a through decanter 25. A pump 23a supplies the water from tank 23 to the product water line 32. The butane from decanter 25 is returned by a pump 25a to surge tank 13 via line 33. Chamber 17 is connected to a brine line 26. Brine from line 26 overflows through the lowermost of several valves 26a which is open and is returned by a pump 26b to the freezer 10. A primary compressor 27 withdraws refrigerant vapor from the freezer 10 via suction line 28 and delivers compressed vapor to the top of the washer-melter 14 via a discharge line 31.

Outlet line 26 from chamber 17 is selectively vented through valve 29 to the top of the washer-melter 14 or through valve 30 in a branch line 28a to suction line 28 communicating with the suction side of compressor 27. Pressure in chamber 17 surrounding screens 16 may thus be controlled at any absolute pressure between that in the freezer 10 and that in the washer-melter 14 by manipulation of valves 29 and 30. Such pressure control is advantageous in controlling the effficiency of ice washing as measured by the wash water lost per pound of ice washed, while simultaneously permitting, as the pressure in the housing 17 is reduced, increased throughput of ice.

The apparatus further comprises a secondary refrigerant compressor 35 and additionally, according to my invention, an auxiliary blower 36. The suction inlet of compressor 35 is connected to the suction line 28 and the net uncondensable vapor in the line 28 is returned via compressor 35 through the condenser 40 to the surge tank 13.

Figure 3:
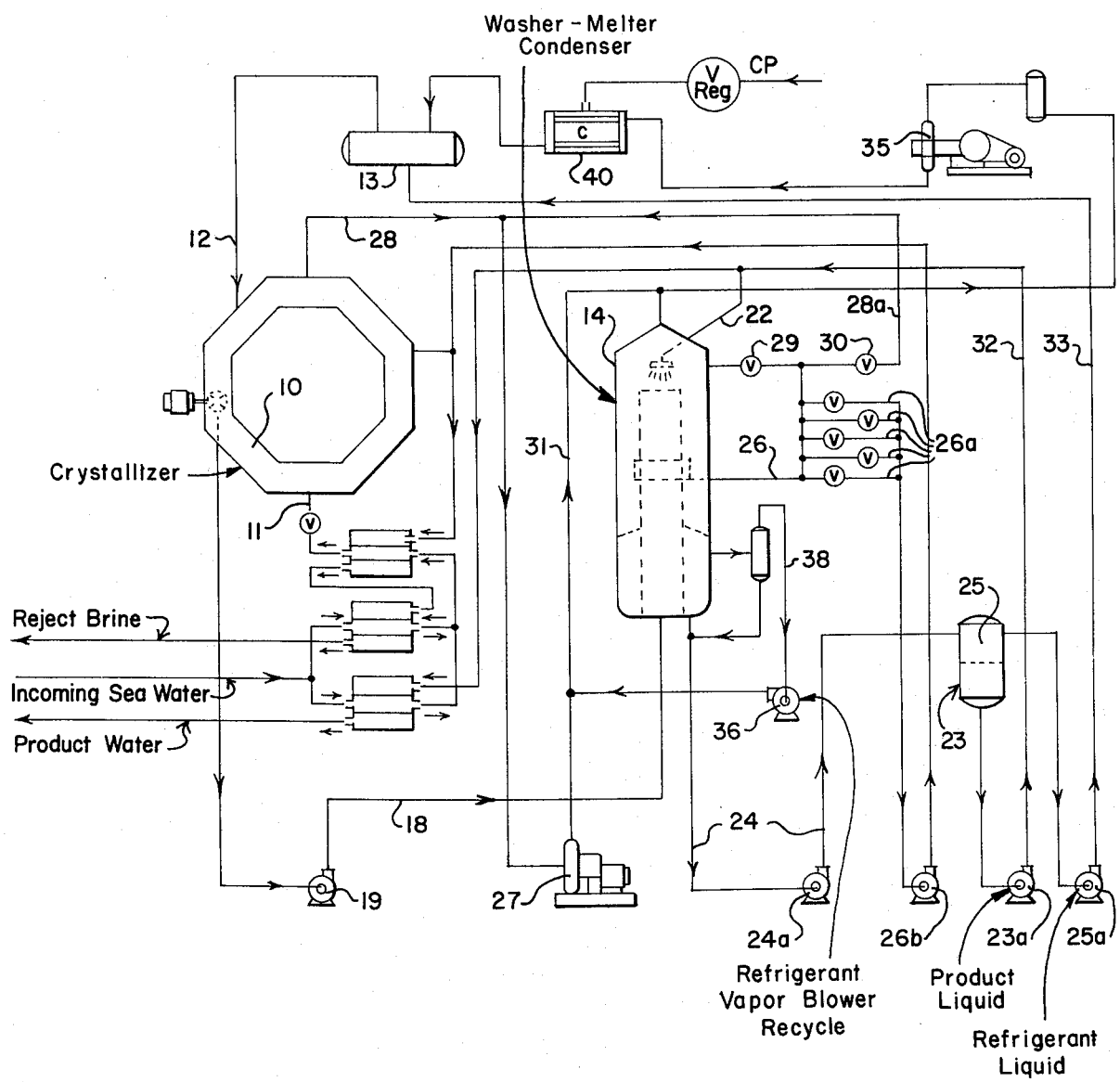
FIG. 3 is a diagrammatic representation of a desalination apparatus in which a modified arrangement is provided for removal of net uncondensable vapor to the secondary compressor.

An equally acceptable alternate arrangement is shown in FIG. 3, in which the suction inlet of the secondary refrigerant compressor 35 is connected to line 31 on the discharge side of compressor 27. It will be noted that in this alternate arrangement the uncondensable refrigerant is also removed from a point between the freezer and the washer-melter, as is the case in FIG. 1. Since, in other respects, the apparatus of FIG. 3 is identical to that of FIG. 1, further description thereof is omitted here to avoid needless repetitive description.

Referring again to FIG. 1, blower 36 serves to recycle the uncondensed refrigerant vapor which is separated from the condensed refrigerant and product water in separator 37, to the top of the melter zone 20. For this purpose, the inlet of the blower 36 is connected to separator 37 by a line 38 and the discharge outlet is connected to discharge line 31 leading from refrigerant compressor 27 to the top of the washer-melter 14.

It should be understood that the pressure drop through the ice bed in the melter zone 20 that is required to prevent water from accumulating deleteriously therein is of the order of 1 inch of water. Consequently, the energy required for operation of an auxiliary blower 36 is considerably less than the energy saved by the arrangements provided according to the invention in which the net uncondensed refrigerant vapor is removed from the primary refrigerant cycle at a point between the freezer and the melter instead of a point beyond the melter.

It should be further understood that a very low velocity of butane vapor recycling around the melter suffices to be effective in removing water and condensed butane from the beds. It was found by David B. Jones in a M.S. Thesis presented to the Faculty of the Graduate School of Cornell University, dated Jan. 1973, entitled "Condensation of Butane Vapor in a Gravity Drained Ice Bed," pages 67 and 68, that the ice melting rate at constant absolute pressure increased from 400 lb/ft$^3$/hr at zero uncondensed butane velocity through an ice bed to 1,000 lb/ft$^3$/hr at a butane velocity of 0.17 ft/sec through a similar bed.

While my invention has been described herein in connection with specific embodiments of apparatus, it will be apparent that various modifications in the apparatus may be made within the terms of the appended claims. Particularly, the apparatus is not limited to the washer-melter combination employed in this specification as a convenient illustration but may include instead a separate washer of any kind and any melter in which refrigerant vapor, condensate and melted ice flow downward through an ice bed.

I claim:

1. In apparatus for desalination of water, which apparatus includes a freezer having a vapor space in which saline water to be purified and a vaporizable liquid refrigerant are in intimate contact so as to produce a refrigerant vapor and a slurry of ice and brine, a washer in which said slurry of ice and brine are separated and the ice washed, a melter in which the separated ice in a bed is melted by direct condensation upon it of a major portion of said refrigerant vapor, means providing a communication between said freezer vapor space and a vapor space at the feed end of said melter including a primary compressor having a suction inlet via which vaporized refrigerant is received from said freezer and a discharge outlet via which compressed refrigerant vapor is supplied to said melter, means for removing ice melt and refrigerant in both liquid and vapor phases from said melter at a discharge end and also functioning to separate ice melt as product water and to provide separate condensed and vapor phases of refrigerant, and means for recycling that portion of the said refrigerant vapor, remaining after the said major portion is condensed, in condensed form to said freezer, the improvement which comprises an auxiliary blower in a passage connecting the discharge end of the melter to the feed end of said melter for recycling refrigerant vapor to a point downstream of said primary compressor in order to increase the rate at which condensed refrigerant and melted ice flows from the ice bed of said melter.

2. Apparatus for desalination of water as claimed in claim 1, including means whereby the said remaining portion of said refrigerant vapor is withdrawn for recycling from a point located in said communication between said freezer vapor space and said vapor space at the feed end of said melter.

3. Apparatus for desalination of water as claimed in claim 1, wherein said means for recycling said remaining portion of refrigerant vapor to said freezer comprises a secondary compressor having a suction inlet in direct communication with the suction inlet of the primary compressor, and a condenser.

4. Apparatus for desalination of water as claimed in claim 1, wherein said means for recycling said remaining portion of refrigerant vapor to said freezer comprises a secondary compressor having a suction inlet in direct communication with the discharge outlet of the primary compressor, and a condenser.

5. In a freezing process for desalination of water having the steps, cyclic with respect to refrigerant, of:

a. making a slurry of ice and brine by vaporizing refrigerant
b. separating ice from brine
c. compressing said vaporized refrigerant
d. applying said compressed vapor directly to the ice in a bed for melting the ice and condensing refrigerant
e. separating refrigerant uncondensed in step (d) from refrigerant condensed in step (d)
f. decanting melted ice from condensed refrigerant
g. withdrawing melted ice as product water
h. and recycling refrigerant condensed in step (d) to step (a)

the improvement which comprises the additional step of recycling directly to the point of application of the compressed vapor to the ice bed of step (d) refrigerant vapor separated from the condensed refrigerant in step (e) whereby the rate at which condensed refrigerant and melted ice flows from said ice bed is increased.

6. In a freezing process for desalination of water according to claim 5, wherein the improvement comprises the additional step of withdrawing net refrigerant uncondensable within said refrigerant cycle from a point in the process located between the freezing and melting steps and then condensing and recycling said refrigerant to step (a).

* * * * *